United States Patent
Metcalf (10) Patent No.: US 10,826,293 B1
(45) Date of Patent: Nov. 3, 2020

(54) POWER SUPPLY LOAD CONTROL USING FREQUENCY

(71) Applicant: Equinix, Inc., Redwood City, CA (US)

(72) Inventor: Gregory Metcalf, San Francisco, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

(21) Appl. No.: 16/425,720

(22) Filed: May 29, 2019

Related U.S. Application Data (60) Provisional application No. 62/711,344, filed on Jul. 27, 2018.

(51) Int. Cl.
| | |
|---|---|
| H02J 3/28 | (2006.01) |
| G05F 1/10 | (2006.01) |
| H02J 3/38 | (2006.01) |
| H02J 9/06 | (2006.01) |

(52) U.S. Cl.
CPC .................. H02J 3/28 (2013.01); G05F 1/10 (2013.01); H02J 3/38 (2013.01); H02J 9/061 (2013.01)

(58) Field of Classification Search
CPC ....... G05F 1/10; H02J 3/38; H02J 3/28; H02J 9/061; H02J 9/00; H02J 9/06
See application file for complete search history.

(56) References Cited

U.S. PATENT DOCUMENTS

| | | | |
|---|---|---|---|
| 4,231,029 A | 10/1980 | Johnston | |
| 6,191,500 B1 | 2/2001 | Toy | |
| 6,639,331 B2 | 10/2003 | Schultz | |
| 2007/0222294 A1 | 9/2007 | Tsukida et al. | |
| 2014/0103727 A1* | 4/2014 | Taimela | H02J 3/46 307/76 |

* cited by examiner

*Primary Examiner* — Carlos Amaya
(74) *Attorney, Agent, or Firm* — Shumaker & Sieffert, P.A.

(57) ABSTRACT

A power supply system includes a plurality of UPSs configured to provide output power to one or more loads using AC power drawn from a supply bus and energy stored at respective energy modules of the plurality of UPSs. Each UPS of the plurality of UPSs comprises a corresponding frequency sensor configured to generate an indication of a frequency of the AC power at the supply bus. The plurality of UPSs comprises a first UPS configured to draw the AC power from the supply bus when the indication of the frequency output by the corresponding frequency sensor for the first UPS satisfies a first frequency priority threshold and a second UPS configured to draw the AC power from the supply bus when the indication of the frequency output by the corresponding frequency sensor for the second UPS satisfies a second frequency priority threshold.

20 Claims, 9 Drawing Sheets

POWER SUPPLY LOAD CONTROL USING FREQUENCY

This application claims the benefit of U.S. Provisional Application No. 62/711,344, filed Jul. 27, 2018, which is hereby incorporated by reference in its entirety.

TECHNICAL FIELD

The disclosure relates to load control for a power supply and, more particularly, to load shed and load add control for a power supply.

BACKGROUND

Data centers frequently include electrical systems, such as servers, that are sensitive to power outages. For example, relatively short power outages at an electrical grid (e.g., a utility connection) may result in relatively long disruptions of services provided by the data center. As such, data centers may rely on uninterruptible power supplies (UPSs) to provide power for operating the data center when an electrical grid outage occurs. To minimize the expense of batteries during a relatively long power outage, data centers frequently include a generator plant that provides power for operating the data center. In this way, battery cells of the UPSs provide power to the data center during relatively short power outages and the generator plant provides power to the data center during relatively long power outages. This use of batteries and a generator plant may be a cost-effective way for helping to ensure power is provided to the data center during both short and long power outages.

SUMMARY

In general, techniques of the disclosure are directed to power supply load control. In some examples, rather than using a programmable logic controller (PLC) and ladder logic to "load add" a power supply, such as one or many uninterruptible power supply (UPS), to a generator or plant consisting of multiple generators in parallel, in a manner that does not overload the generator or plant, a UPS may be configured to load add the UPS to the generator or plant based on a frequency at a supply bus providing power from the generator. For example, a first UPS for a high priority load of a data center may start drawing power from a generator when the frequency at the supply bus meets or exceeds a particular frequency, e.g., 56 Hertz. In this example, a second UPS for a low priority load of the data center may start drawing power from the generator when a frequency at a supply bus meets or exceeds a different particular frequency, e.g., at least 59 Hertz, to take advantage of the droop curve The techniques described herein may provide one or more technical advantages. For instance, by load adding UPSs based on frequencies at the supply bus, the techniques may allow a data center operator (or "provider") to eschew a PLC or other control system for load add determinations, while still preventing the UPSs from overloading the generator.

In one example, a power supply system comprises a supply bus configured to receive alternating current (AC) power generated by one or more generators and a plurality of UPSs configured to provide output power to one or more loads using the AC power drawn from the supply bus and energy stored at respective energy modules of the plurality of UPSs. Each UPS of the plurality of UPSs comprises a corresponding frequency sensor configured to generate an indication of a frequency of the AC power at the supply bus. The plurality of UPSs comprises a first UPS configured to draw the AC power from the supply bus when the indication of the frequency output by the corresponding frequency sensor for the first UPS satisfies a first frequency priority threshold and a second UPS configured to draw the AC power from the supply bus when the indication of the frequency output by the corresponding frequency sensor for the second UPS satisfies a second frequency priority threshold. The first frequency priority threshold comprises a first range of load add frequencies that does not overlap a second range of load add frequencies of the second frequency priority threshold.

In another example, a method comprises providing, by a plurality of UPSs, output power to one or more loads using AC power drawn from a supply bus and energy stored at respective energy modules of the plurality of UPSs. Each UPS of the plurality of UPSs comprises a corresponding frequency sensor configured to generate an indication of a frequency of the AC power at the supply bus. The method further includes drawing, by a first UPS of the plurality of UPSs, the AC power from the supply bus when the indication of the frequency output by the corresponding frequency sensor for the first UPS satisfies a first frequency priority threshold and drawing, by a second UPS of the plurality of UPSs, the AC power from the supply bus when the indication of the frequency output by the corresponding frequency sensor for the second UPS satisfies a second frequency priority threshold. The first frequency priority threshold comprises a first range of load add frequencies that does not overlap a second range of load add frequencies of the second frequency priority threshold.

In another example, a data center system comprises an electrical grid connection configured to output AC power, a generator plant comprising one or more generator units, each generator unit of the one or more generator units configured to output the AC power when the electrical grid connection is not outputting the AC power, a supply bus configured to draw the AC power from the electrical grid connection and from the generator plant, and a plurality of UPSs. The plurality of UPSs are configured to provide output power to one or more loads using the AC power drawn from the supply bus and energy stored at respective energy modules of the plurality of UPSs. Each UPS of the plurality of UPSs comprises a corresponding frequency sensor configured to generate an indication of a frequency of the AC power at the supply bus. The plurality of UPSs comprises a first UPS configured to draw the AC power from the supply bus when the indication of the frequency output by the corresponding frequency sensor for the first UPS satisfies a first frequency priority threshold and a second UPS configured to draw the AC power from the supply bus when the indication of the frequency output by the corresponding frequency sensor for the second UPS satisfies a second frequency priority threshold. The first frequency priority threshold comprises a first range of load add frequencies that does not overlap a second range of load add frequencies of the second frequency priority threshold.

The details of one or more examples are set forth in the accompanying drawings and the description below. Other features, objects, and advantages of the disclosure will be apparent from the description and drawings, and from the claims.

BRIEF DESCRIPTION OF DRAWINGS

Like reference characters denote like elements throughout the figures and text.

DETAILED DESCRIPTION

Electrical loads of a data center, such as those imposed by servers, computers, routers, etc., may be powered by power supplies, such as uninterruptible power supplies (UPSs). The UPSs may normally draw power from an electrical grid connection (e.g., a power company). During an intermittent power interruption (e.g., brownout, voltage surge, etc.), however, the UPSs may provide power to the loads of the data center using an energy storage device (e.g., battery, flywheel, etc.) of the UPSs. During a sustained outage (e.g., more than 0.5 seconds, more than 30 seconds, etc.), the UPSs may provide power to the loads of the data center using power provided by a generator plant.

A generator plant may include one or more generators (e.g., diesel generators, which are commonly referred to as a "gensets") for providing alternating current (AC) power to a data center. However, such generators may become overloaded when UPSs simultaneously begin to draw power from the generator. For example, a control system of a generator may provide a kinetic energy to a rotor of the generator for a relatively light load before the UPSs begin to draw power from the generator. In this example, the control system of the generator may continue to provide the kinetic energy to the rotor of the generator for the relatively light load immediately after the UPSs begin to draw power from the generator, which results in a rapid slowdown of the rotor of the generator. In this example, if the rotation speed of the rotor of the generator slows down below a threshold, the generator may become overloaded, which may cause the generator to shut down.

To avoid overloading a generator, some systems rely on programmable logic controller (PLC) and ladder logic to "load add" a UPS to a generator in a manner that does not overload the generator. For example, a human technician may program a first UPS to load add after a generator operates for 10 seconds and program a second UPS to load add after the generator operates for 30 seconds. In this way, the control system of the generator may increase an amount of kinetic energy provided to the rotor of the generator to account for the additional load from the first UPS before the second UPS begins to draw power from the generator. However, the PLC controller is in addition to a control system for the generator and a control system for the UPSs, thereby resulting in an additional point of failure for the data center compared to systems that omit the PLC controller. Moreover, the PLC controller may be specifically designed, specified, installed, and commissioned for each data center, which adds further expense to systems that use a PLC controller compared to systems that omit the PLC controller.

Techniques described herein permit a control system for UPSs to control a load add and/or load drop of UPSs without relying on an additional PLC controller that is specifically programmed with ladder logic to load add UPSs. For example, a UPS as described herein may include a load add system that draws power from a supply bus when a frequency at the supply bus satisfies a minimum requirement. For instance, a UPS may connect to a supply bus when a frequency of AC power at the supply bus is at least 54 Hertz. Rather than using frequency at the supply bus to only determine whether a minimum required frequency is satisfied, the UPS may determine whether to load add and/or load drop using the frequency at the supply bus and a priority assigned to the UPS. In this way, techniques described herein may help to reduce a number of components used to provide power to loads in data centers compared to systems using an additional PLC controller that is specifically programmed with ladder logic to load add UPSs.

For example, a first UPS for a high priority load of a data center may start drawing power from a generator when a frequency at a supply bus reaches at least 56 Hertz. In this example, a second UPS for a low priority load of the data center may start drawing power from the generator when a frequency at a supply bus reaches at least 59 Hertz. In this way, UPSs may be configured to load add in a manner that helps to avoid overloading a generator without relying on an additional PLC control system.

FIGS. 1A-1F are block diagrams that illustrate a data center 100 during a power outage, in accordance with one or more techniques of the disclosure. Data center 100 may include generator plant 102, electrical grid connection 104, UPS system 106, and load system 108.

Figure 1A:
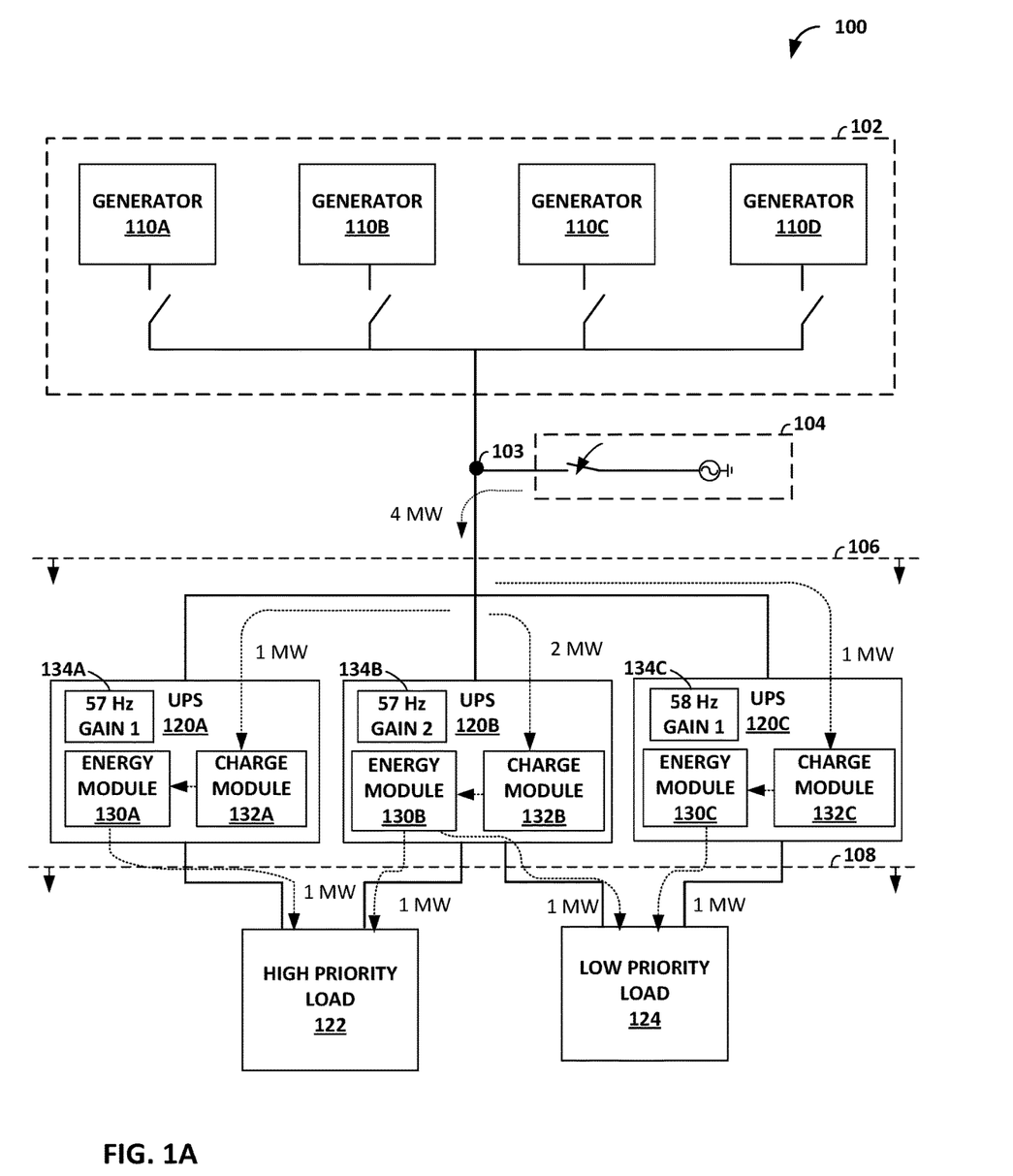
FIGS. 1A-1F are block diagrams that illustrate a data center during a power outage, in accordance with one or more techniques of the disclosure.

Data center 100 may be a facility for storing one or more electronic devices such as servers, network and storage gear, or any other suitable electronic or supporting devices according to particular needs. Data center 100 may be comprised in a stand-alone building used primarily or exclusively for data center 100 or may be a comprised in a portion of a larger building used for other uses including office space, residential space, retail space, or any other suitable use. Data center 100 may be located in an urban, suburban, or rural location or any other suitable location with any suitable climate. Data center 100 may provide an operating environment for co-location, interconnection, and/or other services. For example, data center 100 may provide an operating environment for any number of services that may be categorized according to service types, which may include, for example, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively. In such examples, data center 100 may not provide interconnection services.

Electrical grid connection 104 may be configured to supply power to load system 108. Electrical grid connection 104 may be an output from any suitable power source, such as a utility connection. For example, the output may be about 480 volts AC (VAC) at about 60 Hertz (Hz), between 3 kV and 3.5 kV at about 60 Hz, or another voltage and frequency. Electrical grid connection 104 may be configured to supply a sine wave that includes a positive voltage during a first half (e.g., 0 to $\pi$) of a cycle of the sine wave and a negative voltage during a second half (e.g., $\pi$ to $2\pi$) of the cycle of the sine wave. Although the examples described herein refer to electrical grid connection 104 as having a nominal frequency of 60 Hz, other frequencies may be used, for example, but not limited to, 50 Hz.

Generator plant 102 may be configured to supply power to load system 108 when an outage occurs at electrical grid connection 104. For example, in response to an outage at electrical grid connection 104, one or more of generators 110A-110D (collectively "generators 110") may be activated to supply power to load system 108. In some examples, generator plant 102 may have a redundant generator such that generator plant 102 may supply power to load system 108 when one of generators 110 does not start. Generators 110 may be diesel generators that include a diesel engine and electrical generator, also referred to as "gensets."

UPS system 106 may be configured to supply uninterrupted power to load system 108 using AC power from electrical grid connection 104 and generator plant 102. For example, UPS system 106 may provide electrical power to load system 108 even during outages from electrical grid connection 104 and when generator plant 102 does not output sufficient power to operate load system 108. UPS system 106 may include UPSs 120A that includes energy module 130A, charge module 132A, and frequency priority threshold 134A. Similarly, UPS system 106 may include UPSs 120B that includes energy module 130B, charge module 132B, and frequency priority threshold 134B. Further, UPS system 106 may include UPSs 120C that includes energy module 130C, charge module 132C, and frequency priority threshold 134C. UPS system 106 may include more or fewer UPSs.

Energy modules 130A-130C (collectively, "energy modules 130") may be any suitable device for storing energy. Energy modules 130 may include mechanical energy storage devices (e.g., flywheel), electrical energy storage devices (e.g., capacitor, super capacitors), electrochemical energy storage devices (e.g., batteries), or other types of energy storage devices. Examples of batteries may include, but are not limited to, lead-acid, nickel metal hydride, lithium ion, or other types of batteries.

Charge modules 132A-132C (collectively, "charge modules 132") may be configured to provide energy to energy modules 130. For example, charge modules 132 may include a battery charger configured to convert AC power from electrical grid connection 104 and generator plant 102 into direct current (DC) suitable for increasing energy stored at a battery of energy modules 130. In some examples, charge modules 132 may include a motor configured to convert AC power from electrical grid connection 104 and generator plant 102 into kinetic energy suitable for storage at a flywheel of energy modules 130.

Load system 108 may include various loads. For example, as shown, load system 108 may include high priority load 122 and low priority load 124. High priority load 122 may draw power from more than one of UPSs 120. In the example of FIG. 1A, high priority load 122 may draw power from UPS 120A and UPS 120B. Similarly, low priority load 124 may draw power from more than one of UPSs 120. In the example of FIG. 1A, low priority load 124 may draw power from UPS 120B and UPS 120C.

High priority load 122 and/or low priority load 124 may include one or more servers that respond to requests across a computer network to provide, or help to provide, a network or data service. Each of the servers may include one or more processors that executes software that is capable of accepting requests from clients. High priority load 122 and/or low priority load 124 may include one or more of a database server, file server, mail server, print server, web server, gaming server, application server, communication server, compute server, media server, or any other suitable type of server that may be employed by a data center provider or tenant of the data center provider, according to particular needs. Such servers may be specialized or general-purpose devices. For example, the serves may represent x86 or other real or general-purpose servers configured to apply and/or offer services to customers. The servers may also include special-purpose appliances or containers for providing interconnection services between customers of a co-location facility provided by data center 100 or for providing any other suitable services according to particular needs. The servers may use any suitable operating system including Unix-like open source distributions, such as those based on Linux and FreeBSD, Windows Server, or any other suitable operating system.

In the example of FIG. 1A, electrical grid connection 104 provides power to supply bus 103. For example, electrical grid connection 104 provides 4 megawatts (MW) of power to supply bus 103. In this example, UPSs 120 draw the 4 MW of power from the supply bus and provide 2 MW of power to high priority load 122 and 2 MW of power to low priority load 124.

Figure 1B:
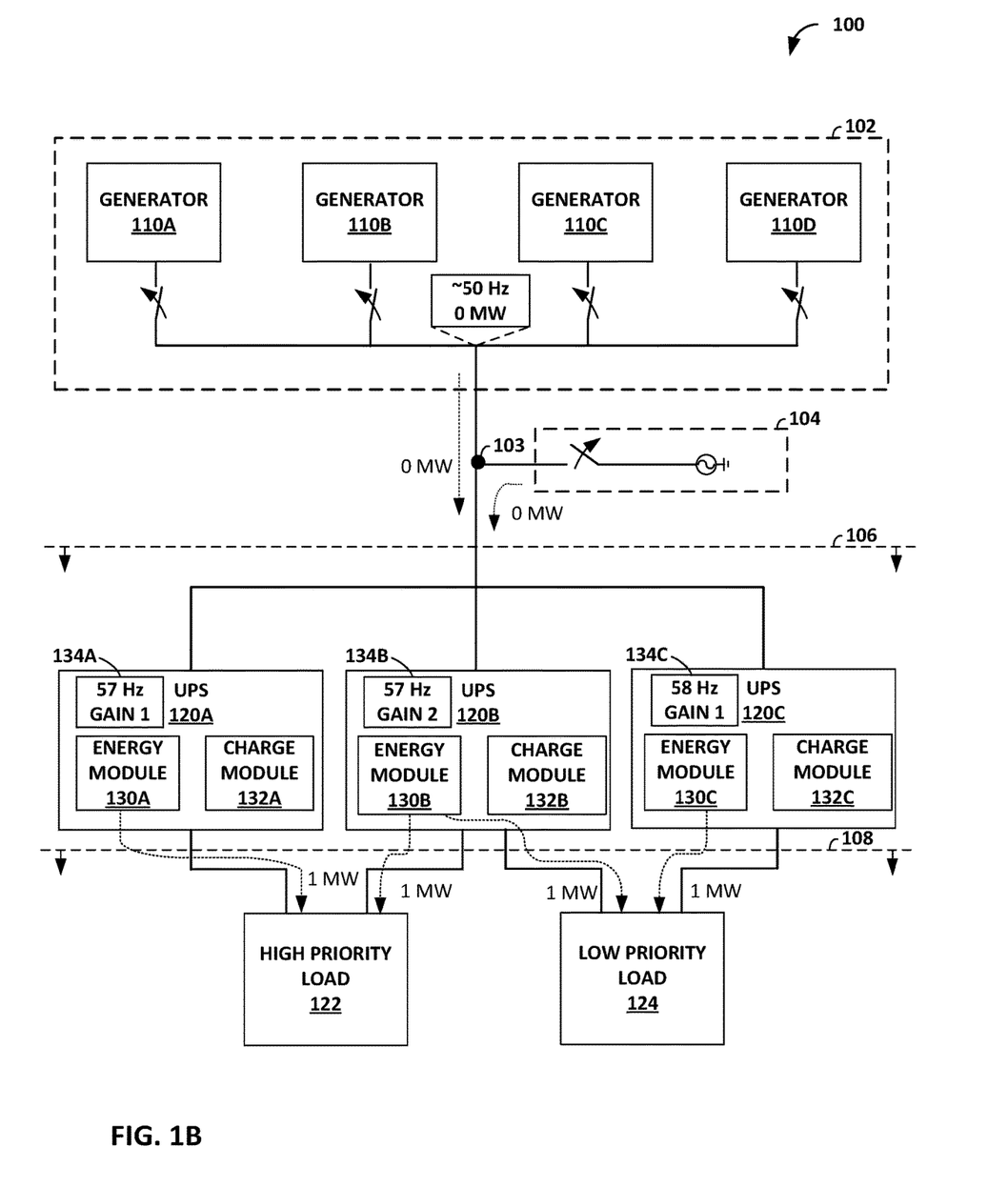

In the example of FIG. 1B, electrical grid connection 104 stops providing power to supply bus 103. For example, an electrical fault may occur at a distribution or transmission system providing power to electrical grid connection 104. As shown, UPSs 120 draw no power from the supply bus and provide 2 MW of power to high priority load 122 and 2 MW of power to low priority load 124 using energy stored in energy modules 130. In this example, generators 110 begin a startup process that does not provide power to supply bus 103.

Figure 1C:
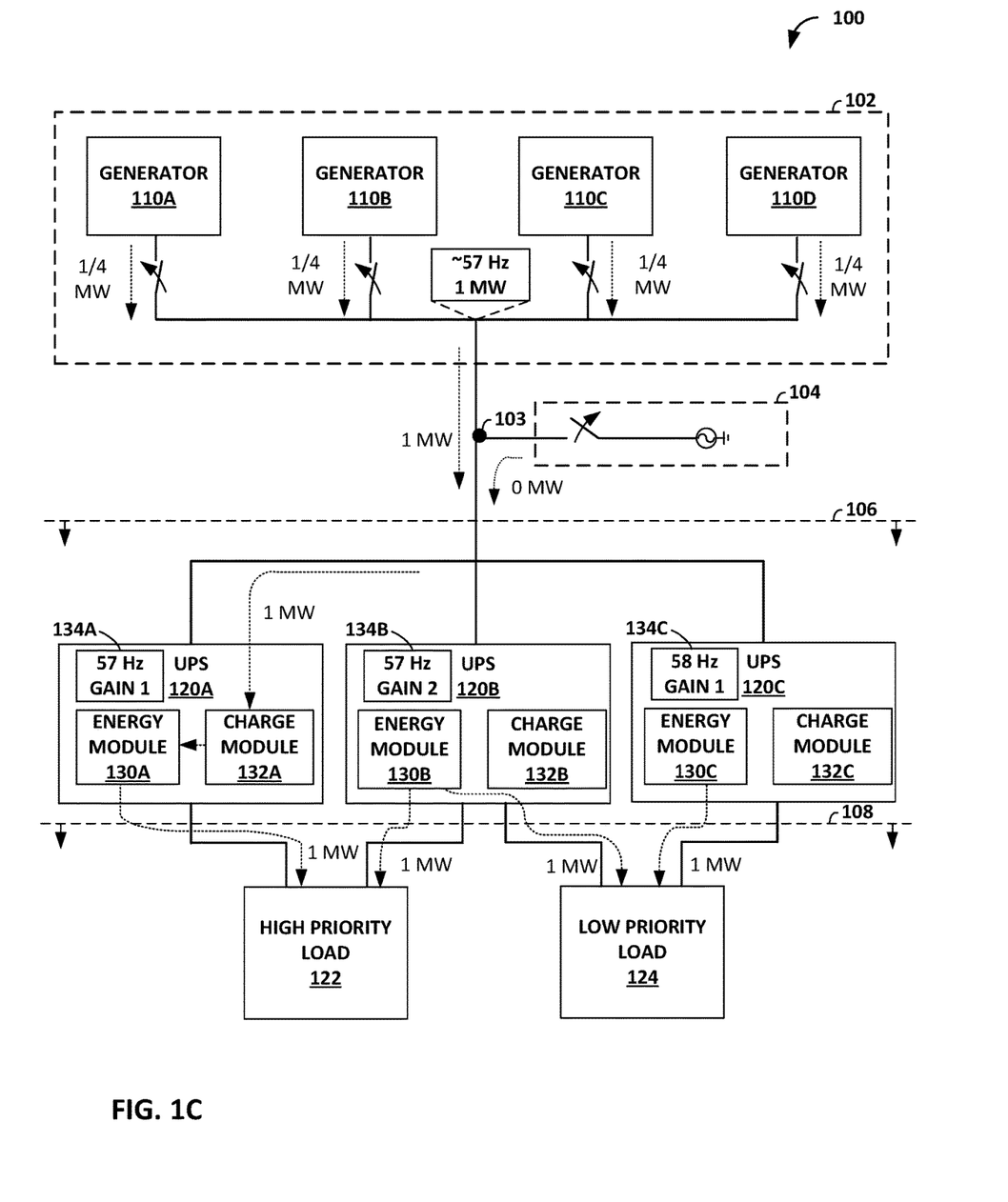

In the example of FIG. 1C, generators 110 begin providing power to supply bus 103. In this example, each one of generators 110 provide ¼ of a MW to supply bus 103. An overload may occur if each of UPSs 120 draw power from supply bus 103. However, in accordance with one or more techniques described herein, UPSs 120 are configured to draw the AC power from supply bus 103 using frequency priority thresholds 134.

Frequency priority thresholds 134 may include a load add threshold. For example, UPS 120A is configured with a frequency priority threshold 134A including a load add threshold of 57 Hz. In some examples, frequency priority thresholds 134 may include a load drop threshold. For example, UPS 120A is configured with a frequency priority threshold 134A including a load drop threshold of 55 Hz. In this way, frequency priority thresholds 134 may operate like a speed (e.g., frequency) droop curve on a generator, but inverted, where frequency drop means reduce the power, no action for over frequency. A hysteresis band may be used with different droop curve for reducing load to the droop curve for adding load.

Frequency priority thresholds 134 may include load add thresholds that are different. For example, frequency priority thresholds 134 may include load add thresholds that do not overlap with each other. As used herein, a first threshold may not overlap a second threshold when a first range of values for the first threshold includes multiple values that are not included in a second range of values for the second threshold. In some examples, frequency priority thresholds 134 may include load add thresholds that specify different minimum load add thresholds. For example, frequency priority threshold 134A may include a load add threshold of 57 Hz to 58 Hz. In this example, frequency priority threshold 134B may include a load add threshold of 58 Hz to 59 Hz that does not overlap the load add threshold of 57 Hz to 58 Hz. In this example, frequency priority threshold 134C may include a load add threshold of 59 Hz to 60 Hz.

Frequency priority threshold 134 may specify an amount of power to draw from supply bus 103 according to a frequency at supply bus 103. For example, frequency priority threshold 134A may specify that UPS 120A adds 0%

(e.g., UPS 120A refrains from drawing power from supply bus 103) when a frequency at supply bus 103 is not greater than 57.0 Hz, adds 50% when a frequency at supply bus 103 corresponds to (e.g., equals) 57.5 Hz, and adds 100% when a frequency (e.g., generator frequency) at supply bus 103 is greater than 58.0 Hz. Such a load add control may allow UPS system 106 to self-regulate because each one of UPSs 120 may be set with a different frequency setting. As such, UPS system 106 may unload only one of UPSs 120 from supply bus 103, and allow the frequency at supply bus 103 to increase back to stability, which may help to keep high priority load 122 and low priority load 124 fully supported. In this way, each UPS of UPSs 120 may determine an amount of power to draw from supply bus 103 using a respective one of frequency priority thresholds 134 and a frequency at supply bus 103.

Likewise on a load add curve, UPS system 106 may be configured to add as much load as possible until a frequency at supply bus 103 reaches less than 60 Hz. In response to the frequency at supply bus 103 reaching less than 60 Hz, UPS system 106 may add as much load (e.g., high priority load 122 and low priority load) as possible such that a frequency at supply bus 103 reaches a dynamic equilibrium. In this example, as frequency falls slightly from 60 Hz, UPS system 106 may remove a small amount of load from low priority load 124 (e.g., the lowest priority that is drawing power) and maintain a load from high priority load 122. In this examples, as frequency rises from 60 Hz, UPS system 106 may add a small amount of load from high priority load 122 and/or low priority load 124.

UPS system 106 may use a linear proportional rectifier control based on a frequency at supply bus 103 with different setpoints for different loads to determine an amount of power to draw from supply bus 103. For example, UPS 120A may apply a linear proportional rectifier control that varies between 0-100% of load according to the frequency at supply bus 103 varying between the range of 57.0 to 58.0 Hz. For example, frequency priority threshold 134A may have a setpoint that causes UPS 120A to add 10% of high priority load 122 to supply bus 103 in response to a frequency of supply bus 103 corresponding (e.g., equals) to 57.1 Hz, add 20% of high priority load 122 to supply bus 103 in response to a frequency of supply bus 103 corresponding (e.g., equals) to 57.2 Hz, add 30% of high priority load 122 to supply bus 103 in response to a frequency of supply bus 103 corresponding (e.g., equals) to 57.3, and so on. In contrast, for example, frequency priority threshold 134C may have a setpoint that causes UPS 120C to add 10% of high priority load 122 to supply bus 103 in response to a frequency of supply bus 103 corresponding (e.g., equals) to 58.1 Hz, add 20% of high priority load 122 to supply bus 103 in response to a frequency of supply bus 103 corresponding (e.g., equals) to 58.2 Hz, add 30% of high priority load 122 to supply bus 103 in response to a frequency of supply bus 103 corresponding (e.g., equals) to 58.3, and so on.

Although this example is discussed with respect to a nominal frequency of 60 Hz, in some examples, UPS system 106 may be configured for a nominal frequency of 50 Hz. For instance, frequency priority threshold 134 may specify that UPS 120A adds 0% when a frequency at supply bus 103 is not greater than 47.0 Hz, adds 50% when a frequency at supply bus 103 is between 47.5 Hz, and adds 100% when a frequency at supply bus 103 is greater than 48.0 Hz.

Similarly, frequency priority thresholds 134 may include load drop thresholds that are different. For example, frequency priority thresholds 134 may include load drop thresholds that do not overlap with each other. In some examples, frequency priority thresholds 134 may include load drop thresholds that specify different minimum load drop thresholds. For example, frequency priority threshold 134A may include a load drop threshold of 56 Hz to 57 Hz. In this example, frequency priority threshold 134B may include a load drop threshold of 57 Hz to 58 Hz. In this example, frequency priority threshold 134C may include a load drop threshold of 58 Hz to 59 Hz. To apply load drop thresholds, UPS system 106 may use a linear proportional rectifier control based on a frequency at supply bus 103, with different setpoints for different loads.

Frequency priority thresholds 134 may include a gain setting. For example, UPSs 120 may include a proportional-integral-derivative (PID) control and the gain settings may be configured to "tune" the gains to settle on a particular load that allows the frequency of supply bus 103 to be held at no lower than a target frequency, such as, for example, but not limited to, 59.0 Hz, in the range of 59.0 Hz to 60.0 Hz.

In the example of FIG. 1C, UPS 120A may be configured to determine that the frequency at supply bus 103 satisfies frequency priority threshold 134A when the frequency at supply bus 103 is greater than the load add threshold of 57 Hz. In this example, frequency priority threshold 134A includes a duration specified by a gain setting that is satisfied. For instance, the frequency at supply bus 103 has satisfied the load add frequency of frequency priority threshold 134A for a duration equal to or greater than a duration specified by the gain setting of frequency priority threshold 134A. As such, UPS 120B draws 1 MW of power from supply bus 103.

In the example of FIG. 1C, UPS 120C is configured to draw the AC power from supply bus 103 when the frequency satisfies frequency priority threshold 134C. Frequency priority threshold 134C may include a range of load add frequencies that does not overlap a range of load add frequencies of frequency priority threshold 134A. For example, UPS 120C may be configured with a frequency priority threshold 134C including a load add threshold of 58 Hz, which is not satisfied (e.g., is greater than) a current frequency at supply bus 103. As such, UPS 120C refrains from drawing power from supply bus 103.

UPS 120B is configured with a frequency priority threshold 134B including a load add threshold of 57 Hz, which is satisfied by a current frequency at supply bus 103. However, frequency priority threshold 134B includes a duration specified by a gain setting that is not satisfied. For instance, the frequency at supply bus 103 has satisfied the load add frequency of frequency priority threshold 134B for a duration less than a duration specified by the gain setting of frequency priority threshold 134B. As such, UPS 120B refrains from drawing power from supply bus 103.

Figure 1D:
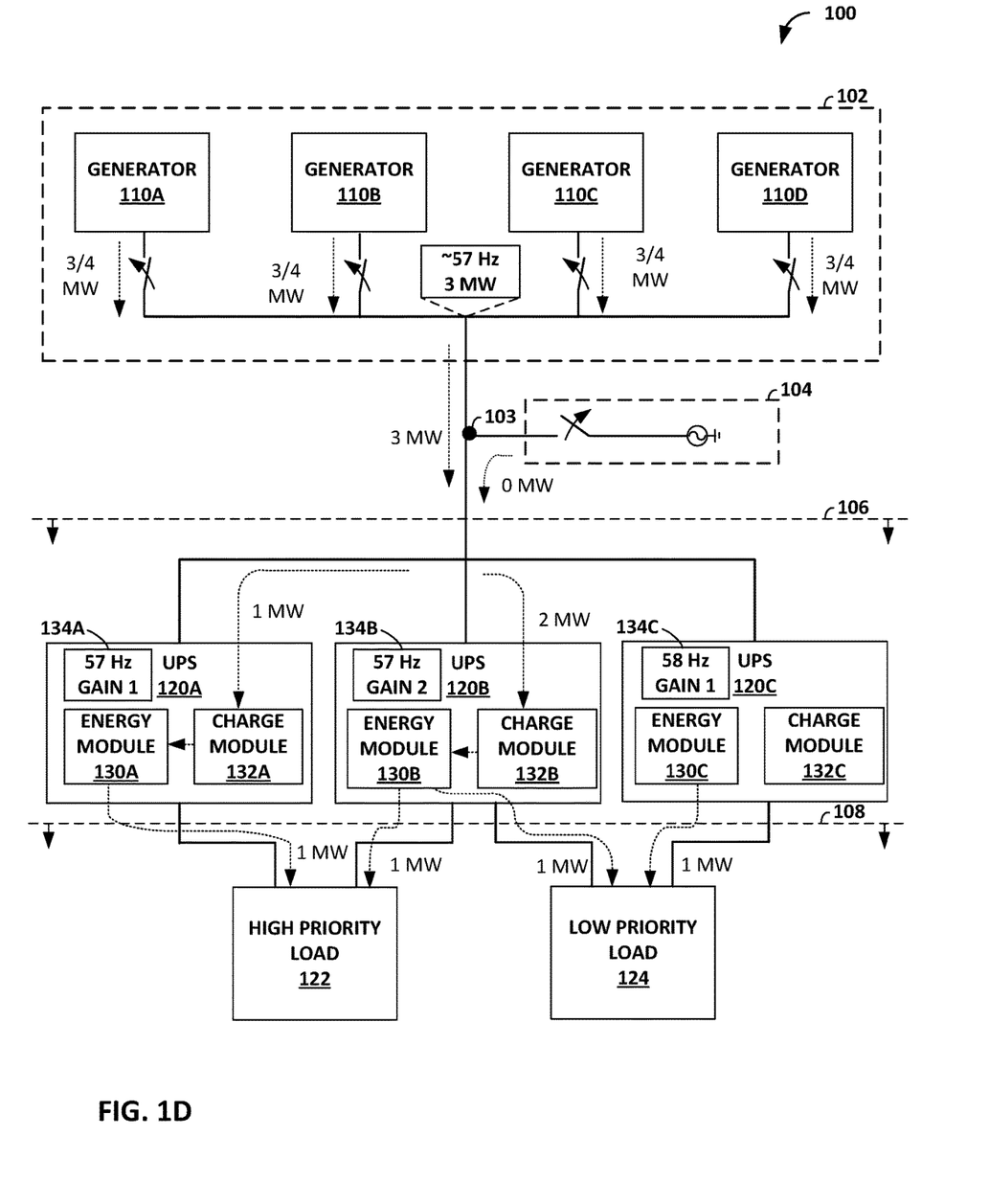

In the example of FIG. 1D, generators 110 begin providing additional power to supply bus 103. In this example, each one of generators 110 provide ¾ of a MW to supply bus 103 and UPS 120A has been drawing 1 MW of power from supply bus 103. An overload may occur if each of UPSs 120 draw power from supply bus 103. However, in this example, UPS 120C is configured with a frequency priority threshold 134C including a load add threshold of 58 Hz, which is not satisfied by (e.g., is greater than) a current frequency at supply bus 103. As such, UPS 120C refrains from drawing power from supply bus 103.

UPS 120B is configured with a frequency priority threshold 134B including a load add threshold of 57 Hz, which is satisfied by a current frequency at supply bus 103. In the example of FIG. 1D, frequency priority threshold 134B includes a duration specified by a gain setting that is satisfied. For instance, the frequency at supply bus 103 has satisfied the load add frequency of frequency priority threshold 134B for a duration equal to or greater than a duration specified by the gain setting of frequency priority threshold 134B. As such, UPS 120B draws power from supply bus 103.

Figure 1E:
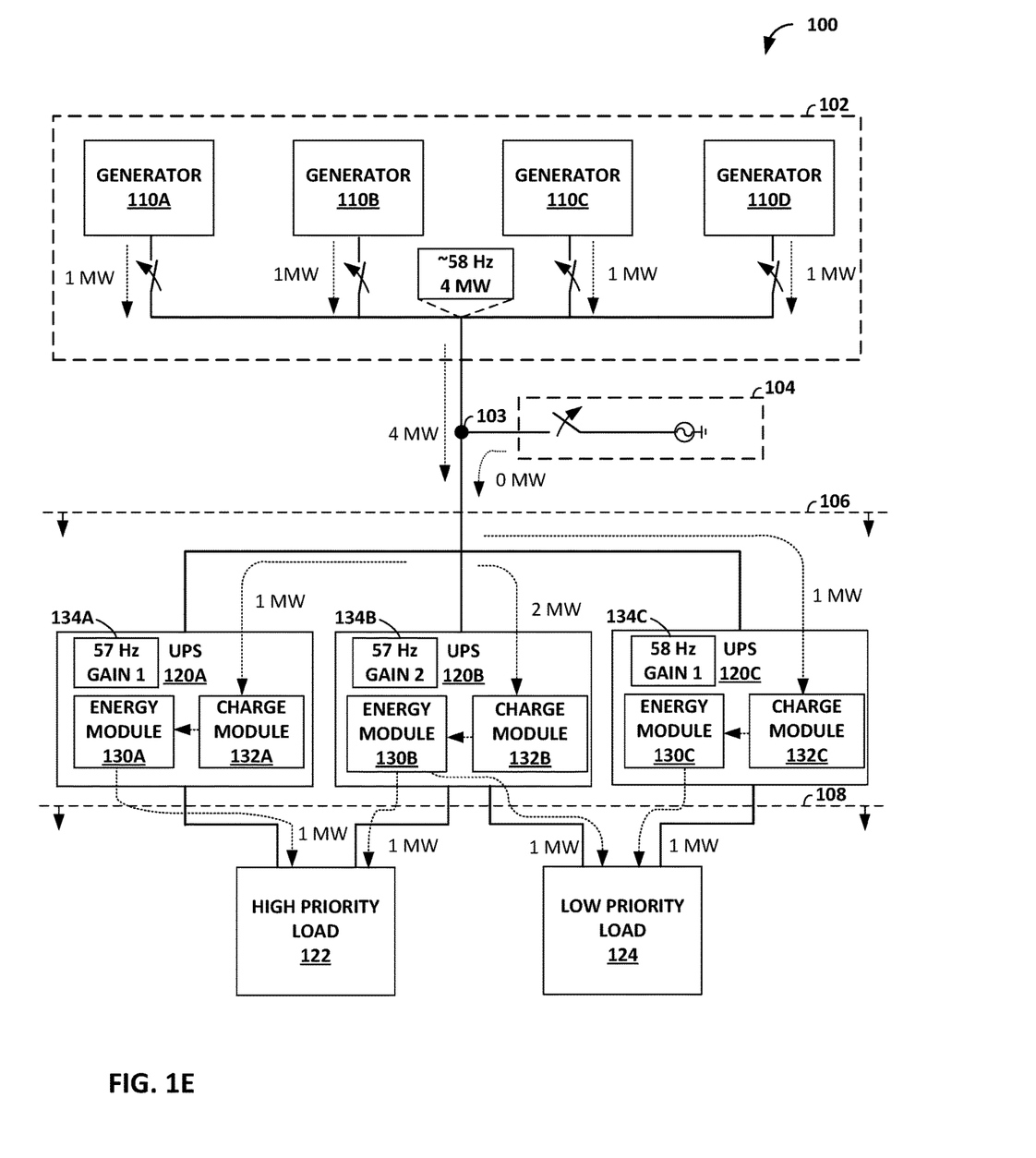

In the example of FIG. 1E, generators 110 begin providing additional power to supply bus 103. In this example, each one of generators 110 provide 1 MW to supply bus 103 and UPSs 120A and 120B have been drawing power from supply bus 103. In this example, UPS 120C is configured with a frequency priority threshold 134C including a load add threshold of 58 Hz, which is satisfied (e.g., is not greater than) a current frequency at supply bus 103. As such, UPS 120C begins drawing power from supply bus 103.

Figure 1F:
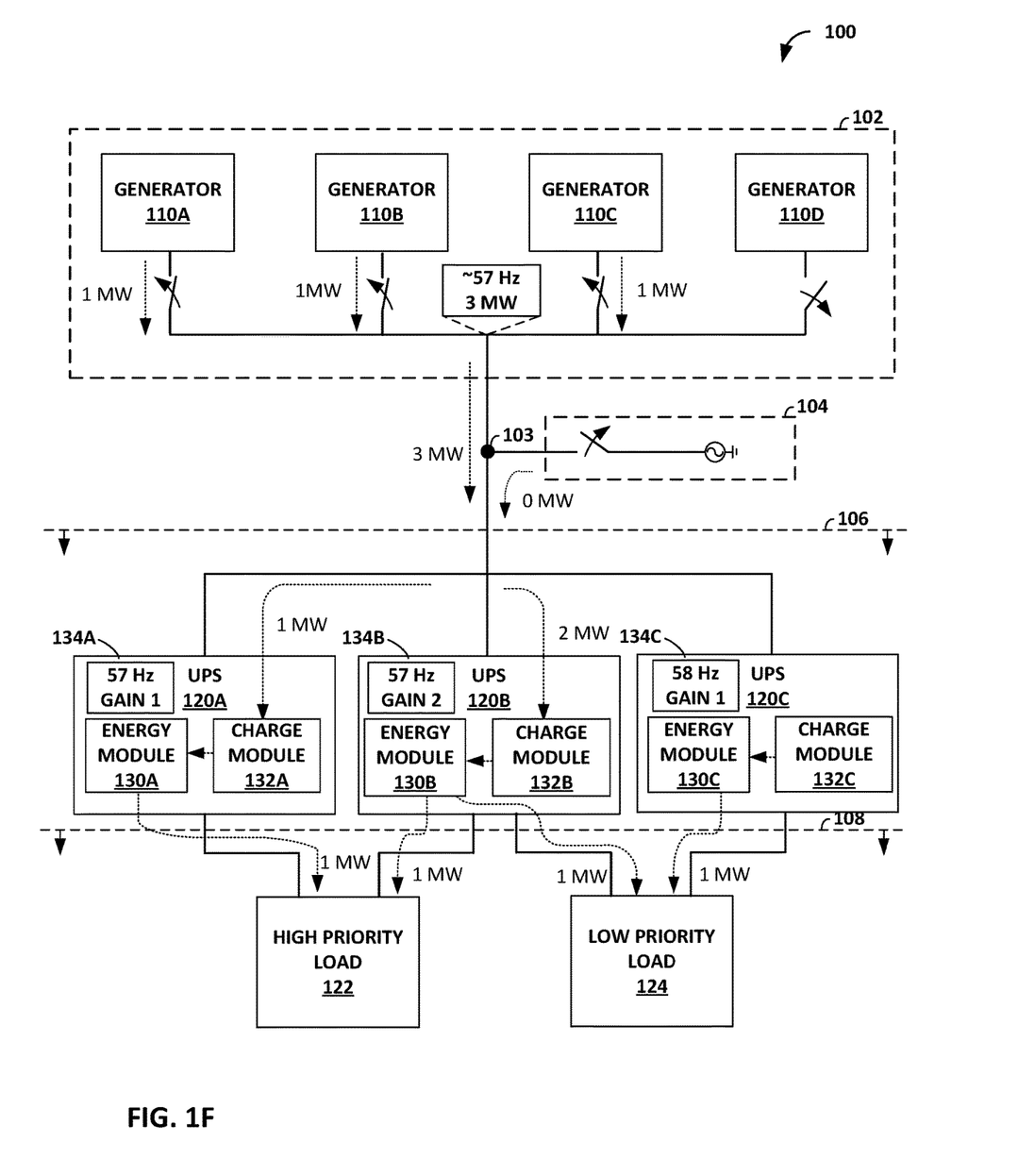

In the example of FIG. 1F, a failure occurs at generator 110D. As such, generators 110 provide 3 MW to supply bus 103, which results in a frequency at supply bus 103 to drop to 57 HZ. After drawing the AC power from supply bus 103, UPSs 120 may be configured to refrain from drawing the AC power from supply bus 103 when the frequency does not satisfy a respective frequency priority threshold 134. For example, after drawing the AC power from supply bus 103, UPS 120A may be configured to refrain from drawing the AC power from supply bus 103 when the frequency is less than a range of load drop frequencies of frequency priority threshold 134A. Similarly, UPS 120B may be configured to refrain from drawing the AC power from supply bus 103 when the frequency is less than a range of load drop frequencies of frequency priority threshold 134B, and UPS 120C may be configured to refrain from drawing the AC power from supply bus 103 when the frequency is less than a range of load drop frequencies of frequency priority threshold 134C.

Load drop frequencies specified by frequency priority thresholds 134 may be different. In the example of FIG. 1F, a range of load drop frequencies of frequency priority threshold 134C may be greater than a range of load drop frequencies of frequency priority threshold 134B and a range of load drop frequencies of frequency priority threshold 134A such that only UPS 120C refrains from drawing the AC power from supply bus 103 in response to the frequency dropping to 57 Hz. As such, in the event of a loss of a generator of generators 110, a lowest priority UPS (e.g., UPS 120C) would eventually drain energy module 130C after trying to support low priority load 124 using energy module 130C if the frequency at supply bus 103 is less than the load add frequency specified by frequency priority threshold 134C. In this example, each UPS of UPSs 120 may be configured with a different gain setting to control the priority of which systems load/unload faster/slower to further control the load add/shed control of data center 100. In this way, a higher priority UPS (e.g., UPS 120A, UPS 120B, etc.) would continue to be supplied by generators 110.

Figure 2:
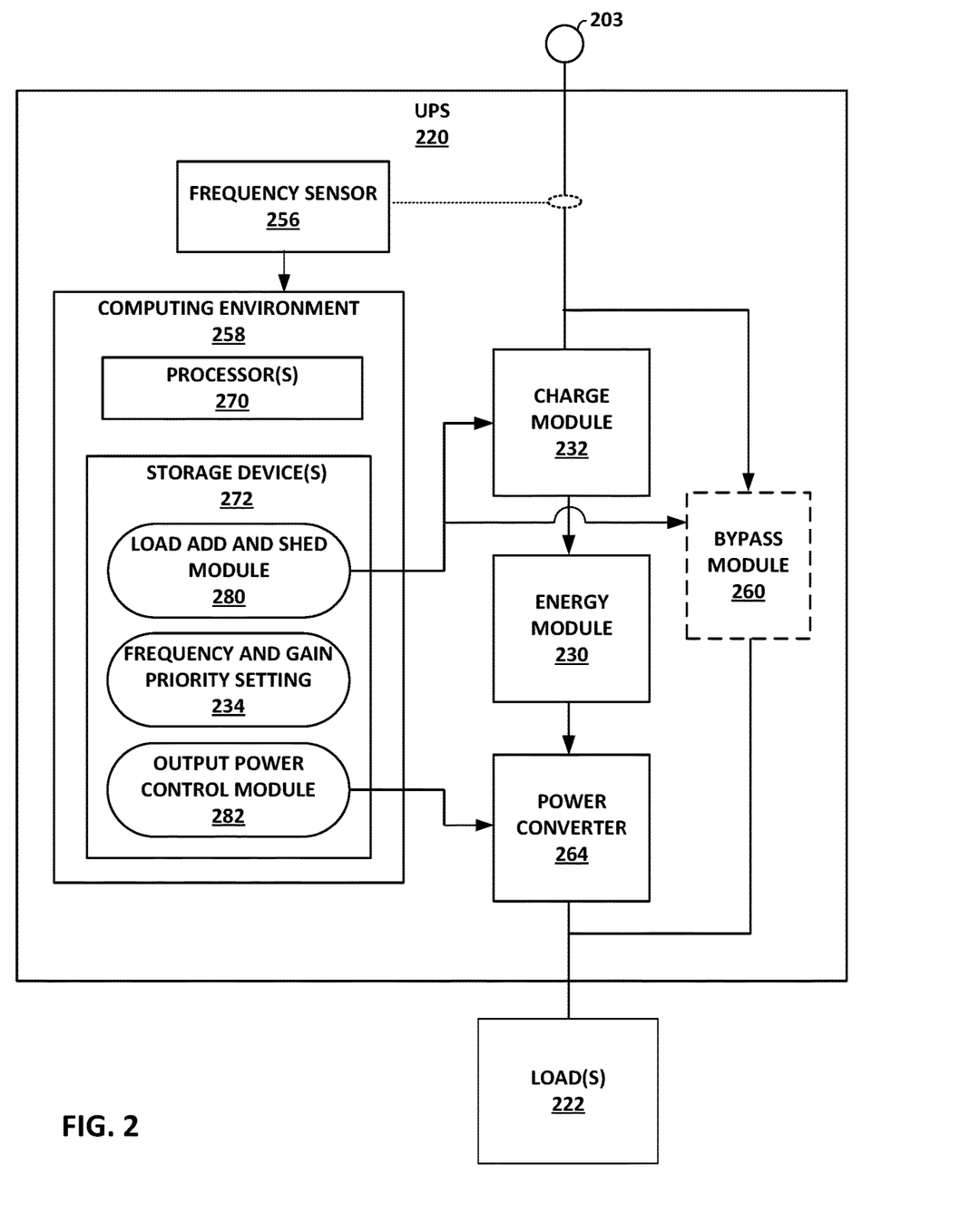
FIG. 2 is a block diagram illustrating a UPS, in accordance with one or more techniques of the disclosure.

FIG. 2 is a block diagram illustrating a UPS 220, in accordance with one or more techniques of the disclosure. UPS 220 may be an example of any one of UPSs 120. UPS 220 may include charge module 232, energy module 230, power converter 264, frequency sensor 256, and computing environment 258. Energy module 230 may be an example of energy modules 130 of FIGS. 1A-1F. For instance, energy module 230 may include a battery or flywheel. Charge module 232 may be an example of charge modules 132 of FIGS. 1A-1F. For instance, charge module 232 may be configured to convert power drawn from supply bus 203 for storage at energy module 230. For instance, charge module 232 may include a rectifier circuit. Frequency sensor 256 may be circuitry configured to output an indication of a frequency at supply bus 203.

Power converter 264 may be configured to convert energy stored at energy module 230 into output power. For example, power converter 264 may be configured to convert energy stored at energy module 230 into output power when the frequency output by frequency sensor 256 does not satisfy a frequency priority threshold specified by frequency and gain priority setting 234. For instance, power converter 264 may include an inverter circuit.

Computing environment 258 may include one or more processors 270 including, for example, one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Computing environment 258 may include one or more storage devices 272. Storage device 272 may include a disk drive, optical drive, and/or memory (such as flash memory, random access memory or RAM) or any other type of volatile or non-volatile memory, that stores instructions to cause, when executed, one or more processors to perform the techniques described herein.

Some systems using a PLC and ladder logic to load add a UPS may include a computing environment configured to help to ensure that power drawn from generators satisfies minimum thresholds. In some examples, computing environment 258 may be configured to help to ensure that power drawn from generators satisfies minimum thresholds. For example, computing environment 258 may determine whether a minimum required frequency (e.g., more than 54 Hertz) is satisfied. In some examples, computing environment 258 may determine whether a minimum required a minimum voltage is satisfied.

In addition to ensuring that power drawn from generators satisfies minimum thresholds, computing environment 258 may be configured to determine whether to load add and/or load drop using the frequency at a supply bus and a priority assigned to UPS 220. For example, storage devices 272 may include a load add and shed module 280 that includes instructions that when executed by one or more processors 270 cause the one or more processors 270 to output a signal that drives charge module 232 and/or bypass module 260 to cause UPS 220 to "draw" AC power. As used herein, UPS 220 may draw AC power when current flows into UPS 220. For example, UPS 220 may draw AC power to provide power (e.g., output an electrical current) to loads 222. In some examples, UPS 220 may draw AC power to charge energy module 230. In some examples, UPS 220 may draw AC power to charge electrical components of UPS 220. Examples of electrical components of UPS 220 that may be charged may include, but are not limited to, an inductor (e.g., discrete, parasitic, etc.), a capacitor (e.g., discrete, parasitic, etc.), or another component that may be charged. Although FIG. 2 illustrates an example where UPS 220 uses only charge module 232 and bypass module 260 to control whether UPS 220 draws AC power, in some examples, UPS 220 may use a switching element (e.g., mechanical relay, electronic switch (e.g., transistor), etc.) to control whether UPS 220 draws AC power.

Load add and shed module 280 may include instructions that when executed by one or more processors 270 cause the one or more processors 270 to output a signal that drives charge module 232 to charge energy module 230. In some examples, load add and shed module 280 causes charge module 232 to output energy for storage at energy module 230 using supply bus 203 when the indication of the frequency output by the corresponding frequency sensor for the first UPS satisfies a frequency priority threshold specified by frequency and gain priority setting 234.

Storage devices 272 includes an output power control module 282 that includes instructions that when executed by one or more processors 270 cause processors 270 to output a signal that drives power converter 264 to provide power to one or more loads 222 using energy stored at energy module 230. In some examples, output power control module 282 causes power converter 264 to provide power to one or more loads 222 using energy stored at energy module 230 when the indication of the frequency output by the corresponding frequency sensor for the first UPS does not satisfy a frequency priority threshold specified by frequency and gain priority setting 234.

In some examples, UPS 220 may optionally include bypass module 260. Bypass module 260 may be configured to couple supply bus 203 to one or more loads 222 when the indication of the frequency output by frequency sensor 256 satisfies a frequency priority threshold specified by frequency and gain priority setting 234. For example, load add and shed module 280 may include instructions that when executed by one or more processors 270 cause processors 270 to output a signal that drives bypass module 260 to couple supply bus 203 to one or more loads 222 when the indication of the frequency output by the corresponding frequency sensor for the first UPS satisfies a frequency priority threshold specified by frequency and gain priority setting 234.

Additionally, or alternatively, output power control module 282 may include instructions that when executed by one or more processors 270 cause processors 270 to drive power converter 264 to convert the energy stored at energy module 230 into the output power for supplying one or more loads 222 when the indication of the frequency output by frequency sensor 256 satisfies the frequency priority threshold specified by frequency and gain priority setting 234. For instance, output power control module 282 may include instructions that when executed by one or more processors 270 cause processors 270 to output a signal that drives power converter 264 to convert the energy stored at energy module 230 into the output power for supplying one or more loads 222 and bypass module 260 is omitted.

Figure 3:
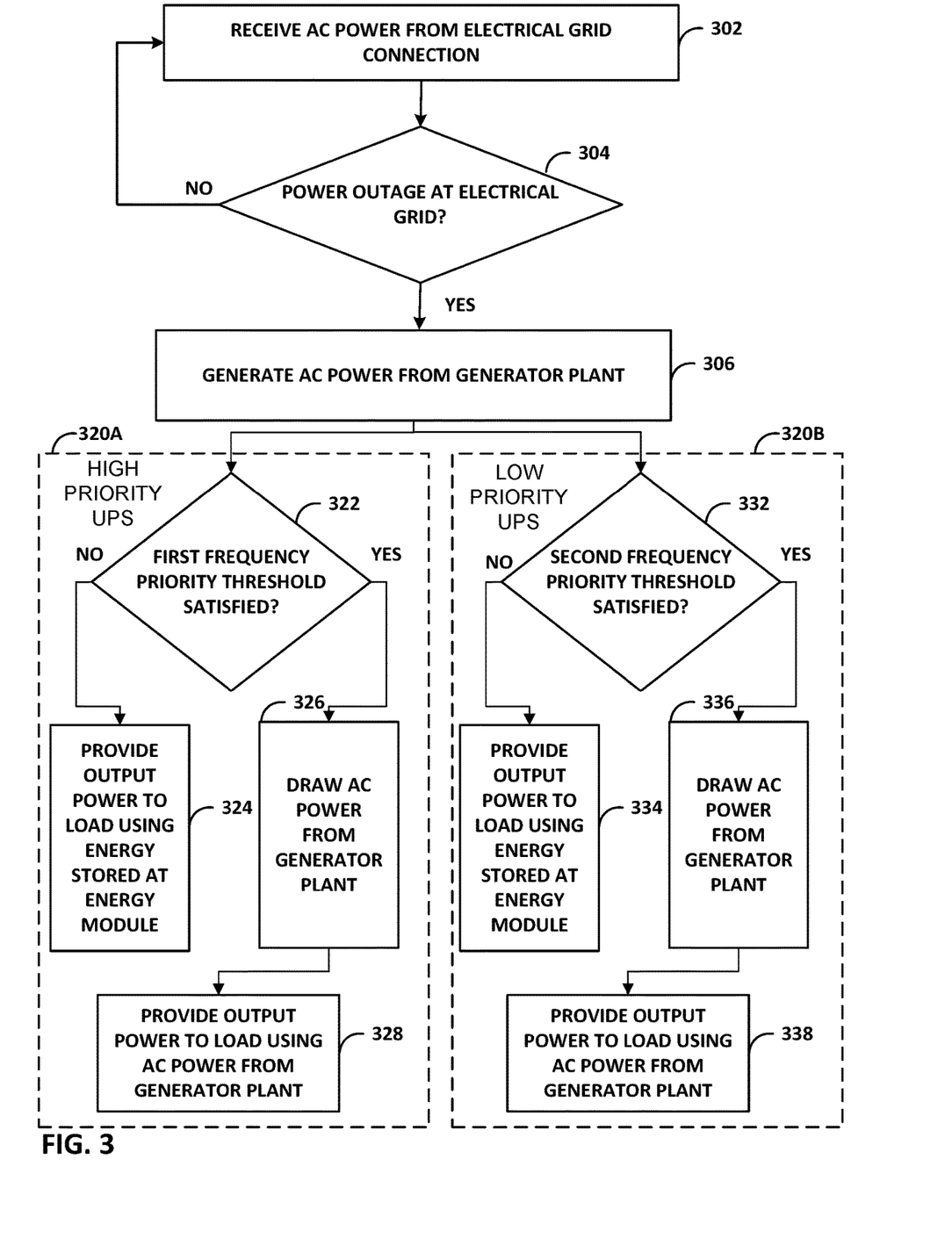
FIG. 3 is a flow chart illustrating an example method for load adding, in accordance with one or more techniques of the disclosure.

FIG. 3 is a flow chart illustrating an example method for load adding, in accordance with one or more techniques of the disclosure. FIG. 3 is discussed in relation to FIGS. 1A-1F and FIG. 2, for exemplary purposes only. Initially, supply bus 103 draws AC power from electrical grid connection 104 (302). If there is no power outage at electrical grid connection 104 ("NO" of step 304), supply bus 103 continues to draw AC power from electrical grid connection 104. If, however, there is a power outage at electrical grid connection 104 ("YES" of step 304), generators 110 generate AC power (306).

High priority UPS 320A, which may be an example of UPS 120A of FIGS. 1A-1F and/or UPS 220 of FIG. 2, determines whether a first frequency priority threshold is satisfied (322). In response to determining the first frequency priority threshold is not satisfied ("NO" of step 322), high priority UPS 320A provides output power to high priority load 122 using energy stored at an energy module (324). For example, power converter 264 provides output power to one or more loads 222 using energy stored at energy module 230.

In response, however, to determining the first frequency priority threshold is satisfied ("YES" of step 322), high priority UPS 320A draws AC power from a generator plant (326). For example, charge module 232 draws power from supply bus 203 to charge energy module. In some examples, bypass module 260 may be activated (e.g., operate in a closed state) to draw power from supply bus 203. High priority UPS 320A provides output power to high priority load 122 using AC power from generator plant 102 (328). For example, power converter 264 provides output power to one or more loads 222 using energy stored at energy module 230 that was provided by charge module 232. In some examples, bypass module 260 may be activated (e.g., operate in a closed state) to provide output power to one or more loads 222 directly using power from supply bus 203.

Low priority UPS 320B, which may be an example of UPS 120B of FIGS. 1A-1F and/or UPS 220 of FIG. 2, may have a second frequency priority threshold that is different from the first frequency priority threshold. For example, the second frequency priority threshold may have a load add threshold that is greater than a load add threshold for the first frequency priority threshold.

Initially, low priority UPS 320B determines whether a second frequency priority threshold is satisfied (332). In response to determining the second frequency priority threshold is not satisfied ("NO" of step 332), low priority UPS 320B provides output power to high priority load 122 using energy stored at an energy module (334). For example, power converter 264 provides output power to one or more loads 222 using energy stored at energy module 230.

In response, however, to determining the second frequency priority threshold is satisfied ("YES" of step 332), high priority UPS 320B draws AC power from a generator plant (336). For example, charge module 232 draws power from supply bus 203 to charge energy module. In some examples, bypass module 260 may be activated (e.g., operate in a closed state) to draw power from supply bus 203. Low priority UPS 320B provides output power to high priority load 122 using AC power from generator plant 102 (338). For example, power converter 264 provides output power to one or more loads 222 using energy stored at energy module 230 that was provided by charge module 232. In some examples, bypass module 260 may be activated (e.g., operate in a closed state) to provide output power to one or more loads 222 directly using power from supply bus 203.

Figure 4:
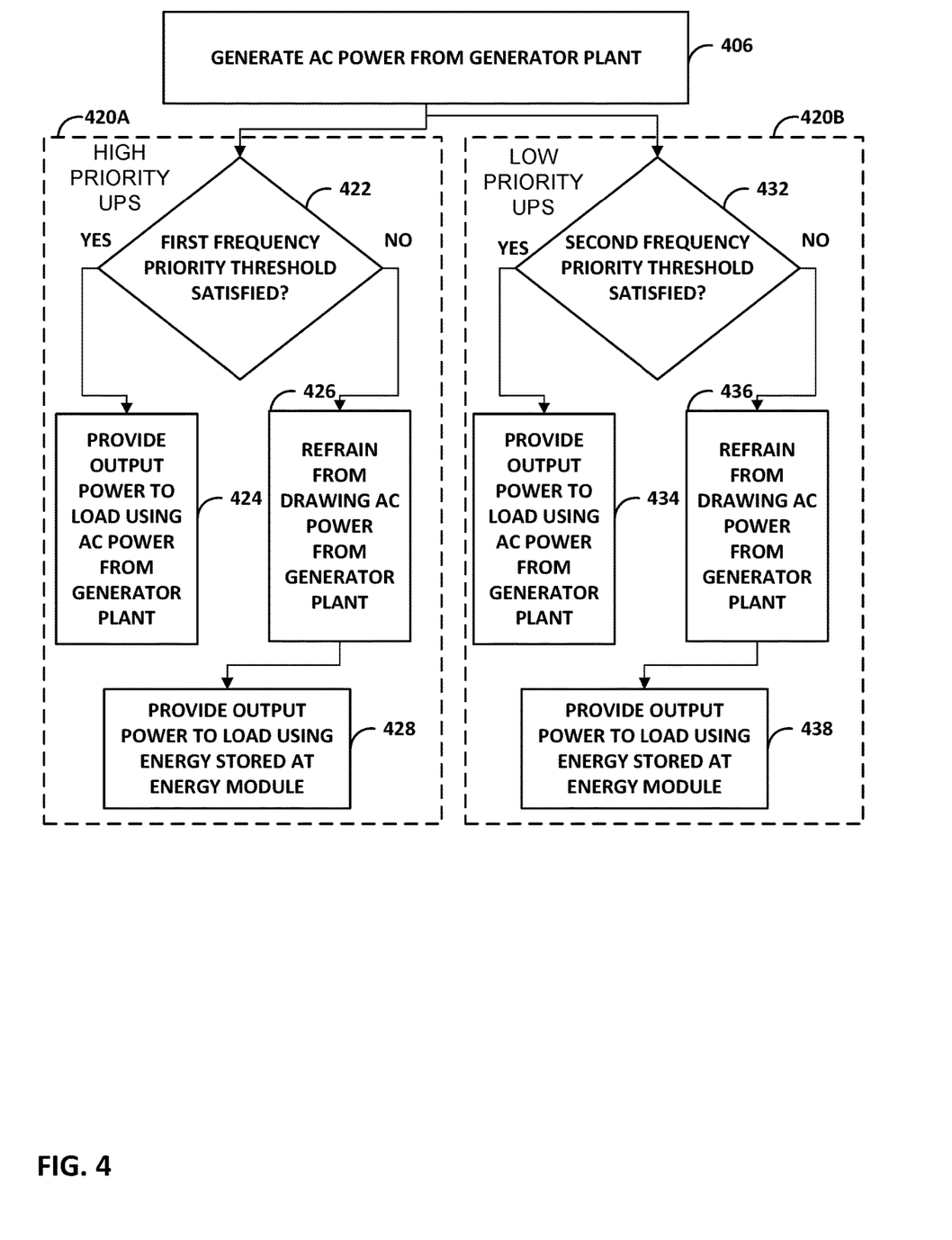
FIG. 4 is a flow chart illustrating an example method for load dropping, in accordance with one or more techniques of the disclosure.

FIG. 4 is a flow chart illustrating a method for load dropping, in accordance with one or more techniques of the disclosure. FIG. 4 is discussed in relation to FIGS. 1A-1F and FIG. 2, for exemplary purposes only. Initially, generators 110 generate AC power (406).

High priority UPS 420A, which may be an example of UPS 120A of FIGS. 1A-1F and/or UPS 220 of FIG. 2, may be configured with a relatively low frequency drop-out band, for example, 56-57 Hz such that high priority UPS 420A may be able to operate at up to 100% load when the frequency is above 57 Hz. In contrast, low priority UPS 420B may be configured with a moderate frequency drop-out band, for example, 57-58 Hz such that low priority UPS 420B may be able to operate at up to 100% load when the frequency is above 58 Hz.

Initially, high priority UPS 420A determines whether a first frequency priority threshold is satisfied (422). For example, load add and shed module 280 determines whether the frequency generated by frequency sensor 256 is less than 56-57 Hz. In response to determining the first frequency priority threshold is not satisfied ("NO" of step 422), high priority UPS 420A provides output power to high priority load 122 using energy stored at an energy module (426). That is, high priority UPS 320A may load drop and energy module 230 (e.g., battery systems) may provide electrical power that cannot be supplied by the generator plant during the outage at the electrical grid. For example, power converter 264 provides output power to one or more loads 222 using energy stored at energy module 230.

In response, however, to determining the first frequency priority threshold is satisfied ("YES" of step 422), high priority UPS 420A continues to draw AC power from a generator plant (424). That is, high priority UPS 420A refrains from load dropping. For example, charge module 232 draws power from supply bus 203 to charge energy module. In some examples, bypass module 260 may be activated (e.g., operate in a closed state) to draw power from supply bus 203. High priority UPS 420A provides output power to high priority load 122 using AC power from generator plant 102 (428). For example, power converter 264 provides output power to one or more loads 222 using energy stored at energy module 230 that was provided by charge module 232. In some examples, bypass module 260 may be activated (e.g., operate in a closed state) to provide output power to one or more loads 222 directly using power from supply bus 203.

Low priority UPS 420B, which may be an example of UPS 120B of FIGS. 1A-1F and/or UPS 220 of FIG. 2, may have a second frequency priority threshold that is different from the first frequency priority threshold. For example, the second frequency priority threshold may have a load drop threshold that is greater than a load drop threshold for the first frequency priority threshold.

Initially, low priority UPS 420B determines whether a second frequency priority threshold is satisfied (432). In response to determining the second frequency priority threshold is not satisfied ("NO" of step 432), low priority UPS 420B provides output power to high priority load 122 using energy stored at an energy module (436). For example, power converter 264 provides output power to one or more loads 222 using energy stored at energy module 230.

In response, however, to determining the second frequency priority threshold is satisfied ("YES" of step 432), high priority UPS 420B draws AC power from a generator plant (434). For example, charge module 232 draws power from supply bus 203 to charge energy module. In some examples, bypass module 260 may be activated (e.g., operate in a closed state) to draw power from supply bus 203. Low priority UPS 420B provides output power to high priority load 122 using AC power from generator plant 102 (438). For example, power converter 264 provides output power to one or more loads 222 using energy stored at energy module 230 that was provided by charge module 232. In some examples, bypass module 260 may be activated (e.g., operate in a closed state) to provide output power to one or more loads 222 directly using power from supply bus 203.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following claims.

What is claimed is:

1. A power supply system comprising:
a supply bus configured to receive alternating current (AC) power generated by one or more generators; and
a plurality of uninterruptible power supplies (UPSs) configured to provide output power to one or more loads using the AC power drawn from the supply bus and energy stored at respective energy modules of the plurality of UPSs, each UPS of the plurality of UPSs comprising a corresponding frequency sensor configured to generate an indication of a frequency of the AC power at the supply bus, the plurality of UPSs comprising:
a first UPS configured to draw the AC power from the supply bus when the indication of the frequency output by the corresponding frequency sensor for the first UPS satisfies a first frequency priority threshold; and
a second UPS configured to draw the AC power from the supply bus when the indication of the frequency output by the corresponding frequency sensor for the second UPS satisfies a second frequency priority threshold, the first frequency priority threshold comprising a first range of load add frequencies that does not overlap a second range of load add frequencies of the second frequency priority threshold.

2. The system of claim 1,
wherein, after drawing the AC power from the supply bus, the first UPS is further configured to refrain from drawing the AC power from the supply bus when the indication of the frequency output by the corresponding frequency sensor for the first UPS does not satisfy the first frequency priority threshold; and
wherein, after drawing the AC power from the supply bus, the second UPS is further configured to refrain from drawing the AC power from the supply bus when the indication of the frequency output by the corresponding frequency sensor for the second UPS does not satisfy the second frequency priority threshold.

3. The system of claim 2,
wherein, to refrain from drawing the AC power from the supply bus, the first UPS is configured to refrain from drawing the AC power from the supply bus when the indication of the frequency output by the corresponding frequency sensor for the first UPS is less than a first range of load drop frequencies of the first frequency priority threshold, and
wherein, to refrain from drawing the AC power from the supply bus, the second UPS is configured to refrain from drawing the AC power from the supply bus when the indication of the frequency output by the corresponding frequency sensor for the second UPS is less than a second range of load drop frequencies of the second frequency priority threshold, wherein the second range of load drop frequencies does not overlap the first range of load drop frequencies.

4. The system of claim 1,
wherein, to draw the AC power from the supply bus, the first UPS is configured to draw the AC power from the supply bus when the indication of the frequency output by the corresponding frequency sensor for the first UPS satisfies the first frequency priority threshold for a first duration specified by a first gain setting, and
wherein the plurality of UPSs comprises a third UPS configured to draw the AC power from the supply bus when the indication of the frequency output by the corresponding frequency sensor for the third UPS satisfies the first frequency priority threshold for a second duration specified by a second gain setting, the second duration being different than the first duration.

5. The system of claim 1,
wherein the first UPS is configured to determine the indication of the frequency output by the corresponding frequency sensor for the first UPS satisfies the first frequency priority threshold when the frequency output by the corresponding frequency sensor for the first UPS is greater than a first load add threshold of the first frequency priority threshold; and
wherein the second UPS is configured to determine the indication of the frequency output by the corresponding frequency sensor for the second UPS satisfies the second frequency priority threshold when the frequency output by the corresponding frequency sensor for the second UPS is greater than a second load add threshold of the second frequency priority threshold.

6. The system of claim 1, wherein the first UPS comprises:
a power converter configured to convert the energy stored at the corresponding energy module for the first UPS into an output power for supplying the one or more loads when the indication of the frequency output by the corresponding frequency sensor for the first UPS does not satisfy the first frequency priority threshold.

7. The system of claim 6, wherein the first UPS comprises:
a bypass module configured to couple the supply bus to the one or more loads when the indication of the frequency output by the corresponding frequency sensor for the first UPS satisfies the first frequency priority threshold.

8. The system of claim 6,
wherein the first UPS comprises a charge module configured to output energy for storage at the corresponding energy module for the first UPS using the supply bus when the indication of the frequency output by the corresponding frequency sensor for the first UPS satisfies the first frequency priority threshold, and
wherein the power converter of the first UPS is further configured to convert the energy stored at the corresponding energy module for the first UPS into the output power for supplying the one or more loads when the indication of the frequency output by the corresponding frequency sensor for the first UPS satisfies the first frequency priority threshold.

9. The system of claim 1, wherein the corresponding energy module for the first UPS comprises a battery or flywheel.

10. The system of claim 1, wherein the one or more loads comprise a high priority load and a low priority load and wherein the first UPS is configured to supply output power to the high priority load and the second UPS is configured to supply output power to the low priority load.

11. The system of claim 10, wherein the second UPS is further configured to supply output power to the high priority load.

12. A method comprising:
providing, by a plurality of uninterruptible power supplies (UPSs), output power to one or more loads using AC power drawn from a supply bus and energy stored at respective energy modules of the plurality of UPSs, each UPS of the plurality of UPSs comprising a corresponding frequency sensor configured to generate an indication of a frequency of the AC power at the supply bus;
drawing, by a first UPS of the plurality of UPSs, the AC power from the supply bus when the indication of the frequency output by the corresponding frequency sensor for the first UPS satisfies a first frequency priority threshold; and
drawing, by a second UPS of the plurality of UPSs, the AC power from the supply bus when the indication of the frequency output by the corresponding frequency sensor for the second UPS satisfies a second frequency priority threshold, the first frequency priority threshold comprising a first range of load add frequencies that does not overlap a second range of load add frequencies of the second frequency priority threshold.

13. The method of claim 12,
refraining, by the first UPS, from drawing the AC power from the supply bus when the indication of the frequency output by the corresponding frequency sensor for the first UPS does not satisfy the first frequency priority threshold after drawing the AC power from the supply bus; and
refraining, by the second UPS, from drawing the AC power from the supply bus when the indication of the frequency output by the corresponding frequency sensor for the second UPS does not satisfy the second frequency priority threshold after drawing the AC power from the supply bus.

14. The method of claim 13,
wherein refraining, by the first UPS, from drawing the AC power from the supply bus comprises refraining from drawing the AC power from the supply bus when the indication of the frequency output by the corresponding frequency sensor for the first UPS is less than a first range of load drop frequencies of the first frequency priority threshold, and
wherein refraining, by the second UPS, from drawing the AC power from the supply bus comprises refraining from drawing the AC power from the supply bus when the indication of the frequency output by the corresponding frequency sensor for the second UPS is less than a second range of load drop frequencies of the second frequency priority threshold, wherein the second range of load drop frequencies does not overlap the first range of load drop frequencies.

15. The method of claim 12, wherein drawing, by the first UPS, the AC power from the supply bus comprises drawing the AC power from the supply bus when the indication of the frequency output by the corresponding frequency sensor for the first UPS satisfies the first frequency priority threshold for a first duration specified by a first gain setting, the method further comprising:
drawing, by a third UPS of the plurality of UPSs, the AC power from the supply bus when the indication of the frequency output by the corresponding frequency sensor for the first UPS satisfies the first frequency priority threshold for a second duration specified by a second gain setting, the second duration being different than the first duration.

16. The method of claim 12, further comprising:
determining, by the first UPS, the indication of the frequency output by the corresponding frequency sensor for the first UPS satisfies the first frequency priority threshold when the frequency output by the corresponding frequency sensor for the first UPS is greater than a first load add threshold of the first frequency priority threshold; and
determining, by the second UPS, the indication of the frequency output by the corresponding frequency sensor for the second UPS satisfies the first frequency priority threshold when the frequency output by the corresponding frequency sensor for the second UPS is greater than a second load add threshold of the second frequency priority threshold.

17. The method of claim 12, further comprising:
converting, by the first UPS, the energy stored at the corresponding energy module for the first UPS into an output power for supplying the one or more loads when the indication of the frequency output by the corresponding frequency sensor for the first UPS does not satisfy the first frequency priority threshold.

18. The method of claim 17, further comprising:
coupling, by the first UPS, the supply bus to the one or more loads when the indication of the frequency output by the corresponding frequency sensor for the first UPS satisfies the first frequency priority threshold.

19. The method of claim 17, further comprising:
outputting, by the first UPS, energy for storage at the corresponding energy module for the first UPS using the supply bus when the indication of the frequency output by the corresponding frequency sensor for the first UPS satisfies the first frequency priority threshold; and
converting, by the first UPS, the energy stored at the corresponding energy module for the first UPS into the output power for supplying the one or more loads when the indication of the frequency output by the corresponding frequency sensor for the first UPS satisfies the first frequency priority threshold.

20. A data center system comprising:
an electrical grid connection configured to output alternating current (AC) power;
a generator plant comprising one or more generator units, each generator unit of the one or more generator units configured to output the AC power when the electrical grid connection is not outputting the AC power;
a supply bus configured to draw the AC power from the electrical grid connection and from the generator plant; and
a plurality of uninterruptible power supplies (UPSs) configured to provide output power to one or more loads using the AC power drawn from the supply bus and energy stored at respective energy modules of the plurality of UPSs, each UPS of the plurality of UPSs comprising a corresponding frequency sensor configured to generate an indication of a frequency of the AC power at the supply bus, the plurality of UPSs comprising:
a first UPS configured to draw the AC power from the supply bus when the indication of the frequency output by the corresponding frequency sensor for the first UPS satisfies a first frequency priority threshold; and
a second UPS configured to draw the AC power from the supply bus when the indication of the frequency output by the corresponding frequency sensor for the second UPS satisfies a second frequency priority threshold, the first frequency priority threshold comprising a first range of load add frequencies that does not overlap a second range of load add frequencies of the second frequency priority threshold.

* * * * *